Nov. 3, 1942.     D. P. FAULK     2,300,538
ELECTRIC DISCHARGE APPARATUS
Filed Jan. 16, 1941     2 Sheets-Sheet 1

WITNESSES:
Leon M. Garman
Nm. C Groome

INVENTOR
Donald P. Faulk.
BY
Hyman Diamond,
ATTORNEY

Nov. 3, 1942.    D. P. FAULK    2,300,538
ELECTRIC DISCHARGE APPARATUS
Filed Jan. 16, 1941    2 Sheets-Sheet 2

WITNESSES:
Leon M. Garman
Wm. C. Groome

INVENTOR
Donald P. Faulk.
BY
Hyman Diamond
ATTORNEY

Patented Nov. 3, 1942

2,300,538

UNITED STATES PATENT OFFICE 2,300,538

ELECTRIC DISCHARGE APPARATUS

Donald P. Faulk, Pittsburgh, Pa., assignor to Westinghouse Electric & Manufacturing Company, East Pittsburgh, Pa., a corporation of Pennsylvania Application January 16, 1941, Serial No. 374,667

25 Claims. (Cl. 219—4)

My invention relates to electric discharge apparatus and has particular relation to welding apparatus.

In welding apparatus constructed and operated in accordance with the teachings of the prior art, of which I am aware, current is supplied to the primary of the welding transformer through electric discharge valves. The primary current is increased gradually in a time interval of the order of 20 or 30 half-periods of the source until it reaches a predetermined value and then is interrupted. As the flux, which was built up in the transformer by the primary current, decays, a potential impulse is induced in the secondary and welding current flows through the secondary and the material to be welded. A mechanical contactor serves to interrupt the primary current. The contactor is provided with a plurality of disconnecting elements which are operable in succession to open short-circuits across a substantial resistance in the primary circuit. When the contactor opens the resistance in the primary circuit is progressively increased. The rate of decay of the flux in the transformer is fixed by the time interval during which the contactor operates.

In practice, difficulty has been experienced with the prior art apparatus. Because of the high reactive impedance in the contactor circuit, a substantial arc is produced between the contacts during interruption. While the apparatus is in use, the contacts open and close repeatedly at short intervals and the arcing soon deteriorates the contactor. A more important disadvantage of the prior art apparatus arises from the fact that the rate of decay of the flux in the transformer is fixed by the rate at which resistance is introduced in the primary circuit and is comparatively small. The range over which the magnitude and duration of the welding current is adjustable is, therefore, narrow and where large current impulses of short duration are required to properly weld a material the prior art apparatus is unsatisfactory.

It is, accordingly, an object of my invention to provide a welding system in which the rate of decay of flux in the welding transformer which induces the welding current shall be large.

Another object of my invention is to provide a welding system in which the rate of decay of flux in the welding transformer which induces the welding current in the secondary shall be adjustable over a wide range.

A further object of my invention is to provide a welding system in which no deleterious arcing shall occur on the opening of the primary circuit of the welding transformer while substantial current is flowing through the primary.

An ancillary object of my invention is to provide a novel control circuit for an electric discharge valve.

Another ancillary object of my invention is to provide an electric discharge valve circuit for controlling the current flow through a highly reactive impedance.

More specifically stated, it is an object of my invention to eliminate the interrupting contactor and its attendant disadvantages from a welding system in which the weld is produced by gradually increasing the current flowing through the primary of a welding transformer and opening the primary circuit when the current reaches a predetermined value.

In accordance with my invention, the current flowing through the primary of the welding transformer is interrupted by impressing a blocking potential across the electric discharge valves through which the current is supplied. The blocking potential is impressed through an auxiliary electric discharge valve and thus an interrupting contactor is avoided. Once the current flow is interrupted, another electric discharge valve, preferably an ignitron, connected in parallel with the primary is rendered conductive and the primary current arising from the decay of flux in the transformer flows through the valve. The conductivity of the auxiliary valve and the parallel valve is controlled from the primary. The latter is connected in the control circuit of the valves in such manner that the reversal of the polarity of the primary potential which occurs when the current flow to the primary is being interrupted renders the valves conductive. The parallel valve, particularly, if it is an ignitron connected across the terminals of the primary through a substantial resistance, in effect, constitutes a shunt circuit across the primary, and the rate of decay of flux in the welding transformer is high. To regulate the rate of decay, the resistance connected in series with the parallel valve in the shunt circuit may be varied. The rate of decay of the flux which produces the current flow through the shunt circuit determines the rate of decay of the flux which produces the current flow through the material to be welded.

The novel features that I consider characteristic of my invention are set forth with particularity in the appended claims. The invention itself, however, both as to its organization and its method of operation, together with further objects and advantages thereof, will best be understood by reference to the following description and to the drawings; in which:

Figure 1:
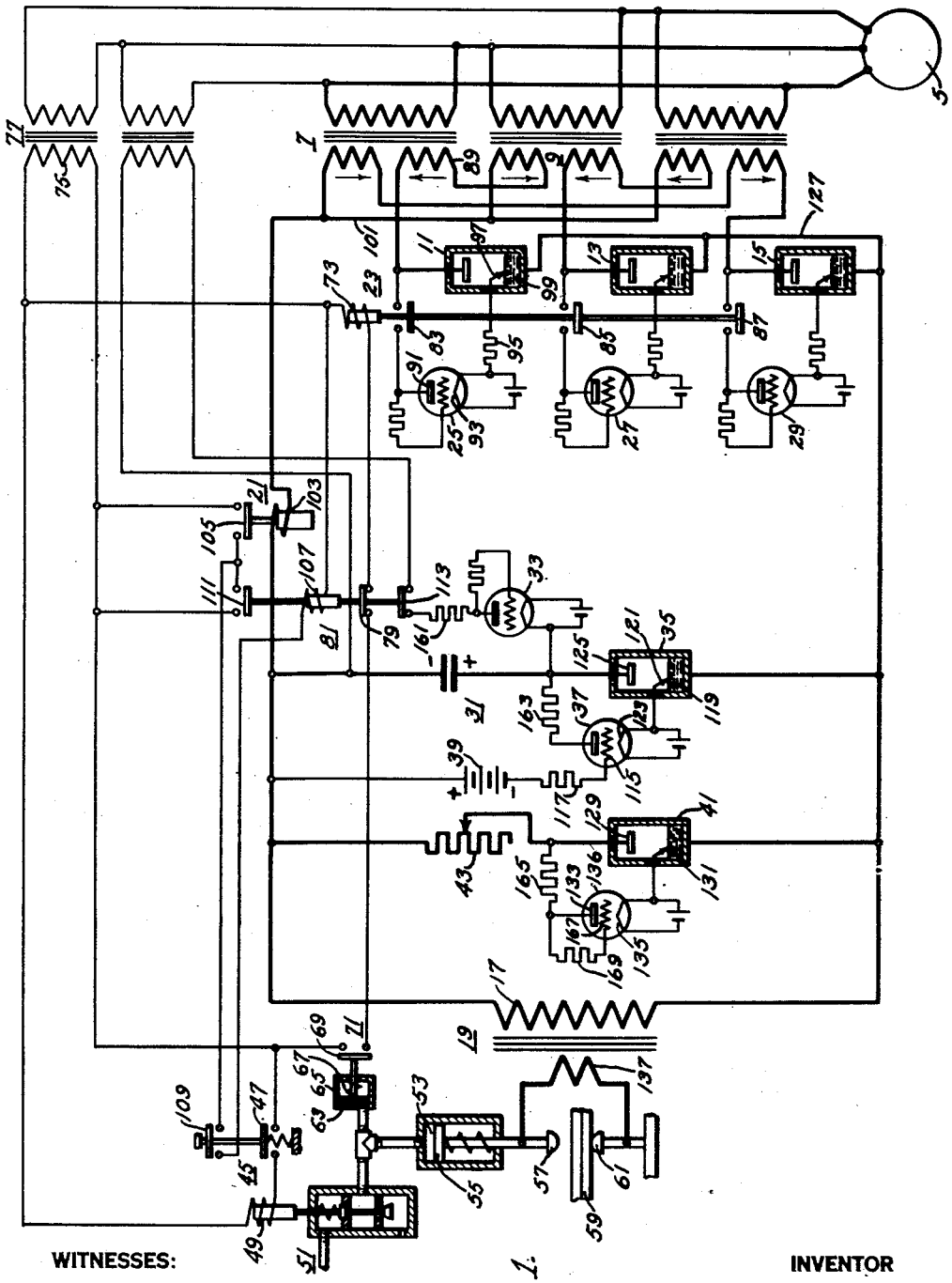
Figure 1 is a diagrammatic view showing a preferred embodiment of my invention.

The apparatus shown in Fig. 1 comprises a polyphase source 5 from which a supply transformer 7 is energized. The secondary 9 of the transformer is connected in zig-zag and electric discharge valves 11, 13 and 15, preferably ignitrons, are connected between the external terminals of each of the windings of the transformer and the primary 17 of a welding transformer 19. The electric discharge valves 11 to 15 need not necessarily be ignitrons. They may be mercury pool devices of other types and in the event that the primary current is relatively small, they may also be discharge devices of the hot cathode type.

The magnitude to which the current flowing through the primary of the welding transformer 19 rises is controlled by a current relay 21. When the current reaches the desired value, the relay 21 operates, actuating an auxiliary relay 23 which opens the anode circuits of the igniter valves 25, 27 and 29 of the supply ignitrons 11, 13 and 15 respectively. The primary current is not interrupted when the firing circuits of the supply ignitrons open. The opening of the circuits merely prevents the ignitrons which happen to be non-conductive when it occurs from becoming conductive in their turn as their anode potentials exceed the anode potentials impressed on the other ignitrons. The ignitron which is conductive when the firing circuits are opened remains conductive under the influence of the back potential impressed from the welding transformer by reason of its high reactance.

The current flow through the latter ignitron is interrupted by a blocking capacitor 31. The capacitor is initially charged to a potential such as to oppose the current flow through the supply ignitrons through a thyratron 33 (or a high vacuum valve) and is connected across the ignitrons 11 to 15 through an auxiliary valve 35, preferably an ignitron. Firing current is supplied to the auxiliary ignitron 35 through a thyratron 37 in the control circuit of which a biasing potential 39 is interposed in series with the algebraic sum of the primary potential of the welding transformer 19 and the potential impressed through whatever supply ignitron happens to be conductive. When the firing circuits of the supply ignitrons are opened, the potential impressed across the ignitron which is last conducting current decreases and the potential across the primary, which is originally negative, increases (becomes progressively less negative and then positive) correspondingly. Eventually, the sum of the potentials attains such a value as to counteract the biasing potential in the control circuit of the thyratron 37 from which the auxiliary ignitron 35 is fired. The ignitron becomes conductive connecting the blocking capacitor 31 across the conductive supply ignitron, and rendering the latter non-conductive.

When the current flow from the supply transformer 7 has been interrupted, a shunting discharge valve 41, which is also preferably an ignitron, is rendered conductive by the further increase of the potential across the primary. The current arising from the decay of flux in the welding transformer 19 discharges through the shunting ignitron and through a variable resistor 43 in series therewith. The resistor may be set at a proper value to correspond to the desired rate of decay.

With the apparatus in the condition illustrated in the drawings, a welding operation may be initiated by closing, a manual controller 45 such as a foot switch, is operated. The lower movable contactor 47 of the controller closes completing an energizing circuit through the exciting coil 49 of a fluid pressure valve 51. The valve operates, permitting a fluid under pressure to flow into a piston chamber 53 and to move a piston 55. The piston carries the movable welding electrode 57 and when it is actuated the movable electrode is urged into engagement with the material 59 to be welded which is held in engagement with the fixed welding electrode 61. The fluid continues to flow, increasing the pressure on the piston 55 and compressing another piston 63 in an auxiliary chamber 65 in communication with the electrode piston chamber 53. The latter piston moves against the action of a spring 67 and closes the movable contactor 69 of a pressure switch 71 when the pressure on the movable welding electrode 57 has reached the desired magnitude.

The exciting coil 73 of the auxiliary relay 23 is now energized in a circuit extending from the upper terminal of the secondary 75 of an auxiliary transformer 77, through the coil 73 of the relay, a normally closed back contact 79 of another auxiliary relay 81, the contact 69 of the back pressure switch 71 to the lower terminal of the secondary. The power relay 23 is actuated and its movable contactors 83, 85 and 87 close completing the firing circuits for the supply ignitrons 11, 13 and 15, respectively. The firing circuits for ignitron 11 extends from the terminal of one of the windings 89 from which the ignitron is supplied through the corresponding contactors 83, the anode 91 and cathode 93 of the firing valve 25, a resistor 95, the igniter 97 and cathode 99 of the ignitron, the primary 17 to the neutral conductor 101. The firing circuits for the other supply ignitrons may be correspondingly traced.

As the potential of each of the phases of the source 5 exceeds the potential of the other phases, firing current flows through the corresponding firing circuits and the corresponding supply ignitrons are rendered conductive. Current flows through the primary 17 and through the energizing coil 103 of the current relay 21. Because of the high reactance of the welding transformer 19, the current through the primary 17 rises gradually. When the current reaches a predetermined value, the current relay 21 is actuated and its contactor 105 closes. A circuit is now completed which extends from the upper terminal of the secondary 75 of the auxiliary transformer 77 through the exciting coil 107 of the auxiliary relay 81, the upper contact 109 of the manual controller 45, the contact 105 of the current relay 81 is actuated and its front contact 111 is closed while its back contacts 79 and 113 are opened.

With the opening of the back contact 79, the circuit for the exciting coil 73 of the relay 23 controlling the firing of the supply ignitrons 11, 13 and 15 is opened and the relay drops out, opening the firing circuits. One of the supply ignitrons is conductive and the other are non-conductive when the firing circuits are opened. As the operation progresses, the non-conductive ignitrons do not become conductive in their turn because their firing circuits are open. The conductive ignitron continues to carry current as the potential of the phase from which it is supplied decreases by reason of the reactive impedance in its anode-cathode circuit. As the phase potential decreases, the potential across the primary 17 of the welding transformer increases and the net potential impressed in the anode circuit of the still conducting ignitron remains positive. The conducting ignitron is rendered non-conductive by impressing the potential of the blocking capacitor 31 in its anode circuit. As an initial step in the sequence of operation which lead to this event, the charging circuit for the capacitor 31 is opened when the back contact 113 of the relay 81 is opened.

The control circuit for the thyratron 37 through which the auxiliary ignitron 35 is fired extends from its control electrodes 115 through a grid resistor 117 to the biasing potential 39, thence the parallel network consisting of the primary 17 of the welding transformer 19 on the one hand, and the windings of supply secondary 9 corresponding to the conductive supply ignitron (11, 13 or 15) on the other hand; and finally through the cathode 119 and the igniter 121 of the auxiliary ignitron 35 to the cathode 123 of the thyratron 37. As the potential across the primary 17 of the welding transformer 19 rises after the ignitron control relay 23 opens, the bias potential 39 in the control circuit of the firing thyratron 37 is counteracted until the critical potential of the thyratron is exceeded and the ignitron 35 becomes conductive connecting the capacitor across the conductive supply ignitron. The capacitor 31 is initially charged so that it positive plate is connected to the anode 125 of the auxiliary ignitron 35 and its negative plate to the neutral conductor 101 of the supply transformer. The cathode 119 of the auxiliary ignitron is connected to the common cathode conductor 127 of the supply ignitrons. The charged capacitor is thus connected across the conductive supply ignitron through one or the other of the windings of the supply secondary 9 in such manner that it opposes the current flow through the latter ignitron and renders it non-conductive. The current relay 21 is now deenergized and drops out but the circuit through the exciting coil 107 of the auxiliary relay 81 is maintained closed through the closed front contact 111 of the relay.

The potential from the primary 17 of the welding transformer 19 is also impressed between the anode 129 and the cathode 131 of the shunting ignitron 41 and between the anode 133 and the cathode 135 of the firing thyratron 136 for the latter (connected to function as an ordinary rectifier) through the variable resistor 43. After the last supply ignitron becomes non-conductive, firing current is supplied to the shunting ignitron 41 and it is rendered conductive. The current arising from the decay of the flux in the welding transformer 19 is now discharged through the ignitron 41. The rate of decay may be adjusted by setting the variable resistor 43. By reason of the decay of flux in the welding transformer, welding current is induced in its secondary 137 and the material 59 is welded.

The operation may be repeated by releasing the manual controller 45 and reclosing it. When the controller is released, the holding circuit for the auxiliary relay 81 is opened at the controller contact 109 and the relay drops out, resetting the apparatus.

Figure 2:
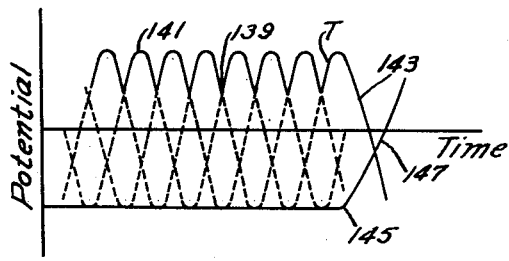
Fig. 2 is a graph showing the relationship between the voltages in the embodiment of my invention shown in Fig. 1.

The variation of the potentials impressed across the control circuit of the thyratron 37 through which the firing current for the auxiliary ignitron 35 is transmitted is illustrated in Figure 2. In the graph shown in this figure, potential is plotted vertically and then horizontally. The sine curves 139 which are shown partly in full lines and partly in broken lines represent the potential derived from the secondary 9 of the supply transformer 7. The full line portions 141 of the curves represent the intervals during which the respective supply ignitrons (11, 13 and 15) are successively conductive. The potential impressed across the primary 17 of the welding transformer 19 through the supply ignitrons is represented by the full line curve formed by combining the full line portions 141 of the sine curves since the potential drop across a conductive ignitron is relatively small.

Assume that at some instant represented by the point T, the current relay operates and the firing circuits for the supply ignitrons 11, 13 and 15 is opened. Only one of the ignitrons is then conductive and the potential which is impressed across the ignitron from the source decreases, as illustrated by the full line branch 143 of the sine curve on the extreme right of the graph. The potential across the primary 17 of the welding transformer 19 is represented by the full line curve 145 in the lower quadrant of the graph. The potential remains substantially constant until the firing circuits for the supply ignitrons are opened. At this point, the potential from the source decreases and the flux in the welding transformer tends to decay. The decay in flux causes an increase in the potential across the primary as illustrated by the rising branch 147 of curve 145 on the right. The net potential which is impressed in the control circuit of the thyratron 37 associated with the auxiliary ignitron 35 is represented by the algebraic sum of the ordinates of the curves 141 and 145. When the sum plus the biasing potential 39 is greater than the critical potential, the thyratron 37 is rendered conductive and the auxiliary ignitron 35 is fired.

Figure 3:
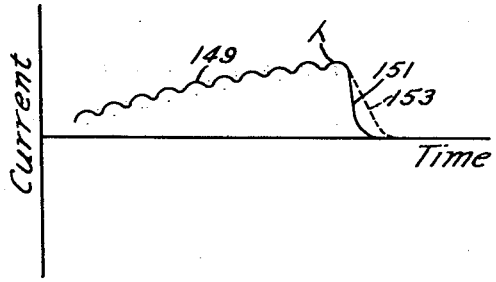
Fig. 3 is a reproduction of an oscillograph produced with apparatus in accordance with my invention.

Fig. 3 is a reproduction of an oscillogram of the current flow through the primary 17 of the welding transformer 19. Current is plotted vertically and time horizontally. The rising wavy branch 149 of the graph corresponds to the increasing current in the primary of the welding transformer. At the instant T, the firing circuits for the supply ignitrons 11, 13 and 15 are opened. Thereafter, the flux in the transformer decays and the resulting current is absorbed in the shunting ignitron 41. The full line loop 151 on the extreme right represents the current flow for one setting of the resistor 43. If the magnitude of the resistance is increased, the current flow may be represented by a curve corresponding to the broken line loop 153.

Figure 4:
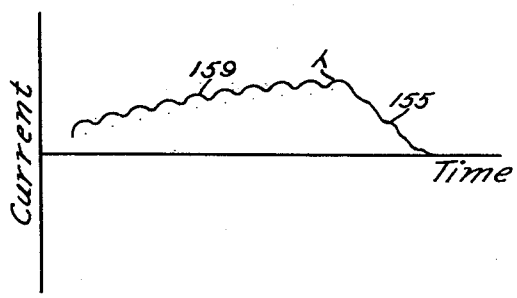
Fig. 4 is a reproduction of a corresponding oscillograph for prior art apparatus.

A corresponding oscillogram for a prior art welder in which resistance is gradually connected in series with the primary of the welding transformer by opening a mechanical contactor, is reproduced in Fig. 4. The wavy loop 155 on the right extending from the wavy branch 157 of the curve represents the current flow in the primary of the welding transformer as the contactor is being opened. It is seen that in a system in accordance with my invention, the rate of decay of the flux is considerably greater than in the prior art apparatus. Moreover, in the practice of my invention, the rate may be varied over an appreciable range. For the welding of many materials, the possibility of varying the rate of decay is an important feature as it enables the operator to correlate the properties of the material to be welded and the magnitude and timing of the welding current precisely.

In a system in accordance with my invention which has actually been constructed and tested, the supply ignitrons 11, 13 and 15 are Westinghouse WL-656 tubes and they are energized from a 220 volt source through a transformer across the secondary windings of which the potential is 130 volts. The firing thyratrons 25, 27 and 29 for the supply ignitrons are Westinghouse WL-632 tubes. The blocking capacitor 31 has a capacity of 500 mf. It is charged from a 440 volt (R. M. S.) source 75 through a 100 ohm resistor 161 and a Westinghouse KU-676 thyratron 33. The auxiliary ignitron 35 and the shunting ignitron 41 are Westinghouse WL-651 tubes. The corresponding firing thyratrons 37 and 136 are Westinghouse WL-632 tubes. The resistor 43 connected in series with the shunting ignitron is 2 to 5 ohms. The current limiting resistors 163 and 165 in the firing thyratron circuits for the auxiliary ignitron and the shunt ignitron are each 10 ohms. In the control circuit of the thyratron, through which the auxiliary ignitron is fired, there is a biasing potential 39 of 45 volts and a .5 meghom grid resistor 117. The control electrode 167 of the thyratron 136 through which the shunting ignitron 41 is fired, is connected to its anode 133 through a .5 megohm resistor 169.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In combination, a reactor, an electric discharge device having an anode and cathode in circuit with said reactor and a control electrode, means for impressing a potential across said reactor for supplying current thereto, means for varying said impressed potential, and a control circuit for said device extending from said control electrode to said cathode and including said reactor for controlling the conductivity of said device in response to the variation of the potential across said reactor as said impressed potential is varied.

2. In combination, a reactor, an electric discharge device having an anode and cathode in circuit with said reactor and a control electrode, means for impressing a potential across said reactor for supplying current thereto, means for decreasing said impressed potential, and a control circuit for said device extending from said control electrode to said cathode and including a source of biasing potential tending to maintain said device non-conductive, and said reactor connected so that the variation in potential across said reactor as said impressed potential is decreased counteracts said biasing potential to render said device conductive.

3. In combination, a reactor, an electric discharge device having a pair of principal electrodes in circuit with said reactor and a control electrode, means for impressing a potential across said reactor for supplying current thereto, means for varying said impressed potential, a control circuit extending between said control electrode and one of said principal electrodes and including said reactor for controlling the conductivity of said device in response to the variation in the polarity of the potential across said reactor as said impressed potential is varied.

4. For use in supplying a reactive load from a source of periodically pulsating potential, the combination comprising electric discharge valve means of the arc like type connected between said source and said reactor for impressing a potential across said reactor to supply current therethrough, a capacitor and a normally non-conductive electric discharge device connected in circuit with said valve means, means for varying the potential impressed across said reactor and control means for said device comprising a control circuit including said reactor so connected that the variation in the potential across said reactor as said impressed potential is varied is effective to render said device conductive thereby to connect said capacitor in circuit with said valve means.

5. For use in supplying a reactive load from a source of periodically pulsating potential, the combination comprising electric discharge valve means of the arc like type connected between said source and said reactor for impressing a potential across said reactor to supply current therethrough, a capacitor and a normally non-conductive electric discharge device connected in circuit with said valve means, means for maintaining said capacitor charged to a potential of a polarity such that the current flow through said valve means would be opposed if said capacitor were connected in circuit with said valve means by rendering said device conductive, means for varying the potential impressed across said reactor and control means for said device comprising a control circuit including said reactor so connected that the variation in the polarity of the potential across said reactor as said impressed potential is varied is effective to render said device conductive thereby to connect said capacitor in circuit with said valve means.

6. For use in supplying a reactive load from a source of periodically pulsating potential, the combination comprising electric discharge valve means of the arc like type connected between said source and said load for impressing a potential across said reactor to supply current therethrough, a capacitor and a normally non-conductive electric discharge device connected in circuit with said valve means, means for controlling the conductivity of said valve means for varying the potential impressed across said load and means responsive to the variation in the potential across said load as said impressed potential is varied for rendering said device conductive thereby to connect said capacitor in circuit with said valve means.

7. For use in supplying a reactive load from a source of periodically pulsating potential, the combination comprising electric discharge valve means of the arc like type connected between said source and said load for impressing a potential across said reactor to supply current therethrough, a capacitor and a normally non-conductive electric discharge device connected in circuit with said valve means, means for varying the potential impressed across said load and means, responsive to the variation of the polarity of the potential across said load as said impressed potential is varied for rendering said device conductive thereby to connect said capacitor in circuit with said valve means.

8. For use in supplying a reactive load from a source of polyphase potential, the combination comprising electric discharge valve means of the arc like type connected between said source and said load for impressing a potential across said reactor to supply current therethrough, a capacitor and a normally non-conductive electric discharge device connected in circuit with said valve means, means for interrupting the connections between certain of the phase terminals of said source and said load to vary the potential impressed across said load and means responsive to the variation in the potential across said load as said impressed potential is varied for rendering said device conductive thereby to connect said capacitor in circuit with said valve means.

9. For use in supplying a reactive load from a source of periodically pulsating potential, the combination comprising electric discharge valve means of the arc like type connected between said source and said load for impressing a potential across said reactor to supply current therethrough, a capacitor and a normally open circuit-closing-and-opening means connected in circuit with said valve means, means for varying the potential impressed across said load and means responsive to the variation in the polarity of the potential across said load as said impressed potential is varied for closing said circuit-closing-and-opening means thereby to connect said capacitor in circuit with said valve means.

10. For use in supplying a reactive load from a source of polyphase potential, the combination comprising electric discharge valve means of the arc like type connected between each phase of said source and said load, means for rendering the valve means connected to the phases of said source conductive in succession for impressing a potential across said reactor to supply current therethrough, a capacitor and a normally non-conductive electric discharge device connected in circuit with said valve means, means for preventing the valve means connected to certain of the phases of said source from becoming conductive in their turn to vary the potential impressed across said load and means responsive to the variation in the potential across said load as said impressed potential is varied for rendering said device conductive thereby to connect said capacitor in circuit with said valve means.

11. For use in supplying a reactive load from a source of polyphase potential, the combination comprising electric discharge valve means of the arc like type connected between each phase of said source and said load, means for rendering the valve means connected to the phases of said source conductive in succession for impressing a potential across said reactor to supply current therethrough, a capacitor and a normally non-conductive electric discharge device connected in circuit with said valve means, means for preventing the valve means connected to all but one of the phases of said source from becoming conductive in their turn to vary the potential impressed across said load and means responsive to the variation in the potential across said load as said impressed potential is varied for rendering said device conductive thereby to connect said capacitor in circuit with said valve means.

12. For use in supplying a reactive load from a source of polyphase potential, the combination comprising electric discharge valve means of the arc like type connected between each phase of said source and said load, means for rendering the valve means connected to the phases of said source conductive in succession for impressing a potential across said reactor to supply current therethrough, a capacitor and a normally non-conductive electric discharge device connected in circuit with said valve means, means for preventing the valve means connected to the phases of said source from becoming conductive in their turn, once they are rendered non-conductive, to vary the potential impressed across said load and means responsive to the variation in the potential across said load as said impressed potential is varied for rendering said device conductive thereby to connect said capacitor in circuit with said valve means.

13. For use in supplying a reactive load from a source of polyphase potential, the combination comprising electric discharge valve means of the arc like type connected between each phase of said source and said load, means for rendering the valve means connected to the phases of said source conductive in succession for impressing a potential across said reactor to supply current therethrough, a capacitor and a normally non-conductive electric discharge device connected in circuit with said valve means, means responsive to the current flow through said load for preventing the valve means connected to the phases of said source from becoming conductive in their turn once they are rendered non-conductive to vary the potential impressed across said load and means responsive to the variation in the potential across said load as said impressed potential is varied for rendering said device conductive thereby to connect said capacitor in circuit with said valve means.

14. For use in welding a material from a source comprising a work circuit including said material, reactive means in inductive relationship with said work circuit, means for supplying current from said source through said reactive means, means for interrupting the supply of current from said source through said reactive means and electric discharge valve means in circuit with said reactive means for conducting the current produced by the decay of flux in said reactive means when the current flow therethrough is interrupted.

15. For use in welding a material from a source comprising a work circuit including said material, reactive means in inductive relationship with said work circuit, means for supplying current from said source through said reactive means, means for interrupting the supply of current from said source through said reactive means, electric discharge valve means in circuit with said reactive means for conducting the current produced by the decay of flux in said reactive means when the current flow therethrough is interrupted, and adjustable means in circuit with said valve means for determining the rate of decay of said flux.

16. For use in welding a material from a source comprising a work circuit including said material, reactive means in inductive relationship with said work circuit, means for supplying current from said source through said reactive means, means for interrupting the supply of current from said source through said reactive means, electric discharge valve means in circuit with said reactive means for conducting the current produced by the decay of flux in said reactive means when the current flow therethrough is interrupted, and variable impedance means in circuit with said valve means for adjusting the rate of decay of said flux.

17. For use in welding a material from a source comprising a work circuit including said material, reactive means in inductive relationship with said work circuit, means for supplying current from said source through said reactive means, means responsive to the current flow through said reactive means for interrupting the supply of current from said source through said reactive means and electric discharge valve means in circuit with said reactive means for conducting the current produced by the decay of flux in said reactive means when the current flow therethrough is interrupted.

18. For use in welding a material from a source comprising a welding transformer having a primary and a secondary, said secondary being in circuit with said material, means for supplying current from said source through said primary, means for interrupting the supply of current from said source through said primary and electric discharge valve means in circuit with said primary for conducting the current produced by the decay of flux in said transformer when the current flow therethrough is interrupted.

19. In combination, a reactor, an electric discharge device having a pair of principal electrodes in circuit with said reactor and a control electrode, means for impressing a potential across said reactor for supplying current thereto, means for decreasing said impressed potential to effect a change in polarity of the potential across said reactor, a control circuit for said device extending between said control electrode and one of said principal electrodes and including a source of biasing potential tending to maintain said device non-conductive, said control circuit also including said reactor so connected that the potential across said reactor tends to counteract said biasing potential to render said device conductive when said change in polarity is effected.

20. For use in supplying a reactive load from a source of potential, the combination comprising electric discharge valve means of the arc-like type connected between said source and said reactor for impressing a potential across said reactor to supply current therethrough, a capacitor and a normally non-conductive electric discharge device connected in circuit with said valve means, means for varying the potential impressed across said reactor to effect a change in the polarity of the potential across said reactor, and control means for said device comprising a control circuit including said reactor and means tending to prevent said device from being rendered conductive, said reactor being so connected that the potential thereacross counteracts said preventive means and effects conductivity of said device when said change in polarity is effected.

21. For use in supplying a reactive load from a source of potential, the combination comprising electric discharge valve means of the arc-like type connected between said source and said reactor for impressing a potential across said reactor to supply current therethrough, a capacitor and a normally non-conductive electric discharge device connected in circuit with said valve means, means for controlling the conductivity of said valve means for varying the potential impressed across said load and thereby effect a change in the polarity of the potential across said load, and means responsive to the variation in the polarity of the potential across said load as said impressed potential is varied for rendering said device conductive thereby to connect said capacitor in circuit with said valve means.

22. For use in supplying energy to a work circuit from a source of current, the combination comprising reactive means in inductive relationship with said work circuit, means for supplying current from said source through said reactive means, means for interrupting the supply of current from said source through said reactive means and electric discharge valve means in circuit with said reactive means for conducting the current produced by the decay of flux in said reactive means when the current flow therethrough is interrupted.

23. For use in supplying energy to a work circuit from a source of current, the combination comprising reactive means in inductive relationship with said work circuit, means for supplying current from said source through said reactive means, electric discharge valve means in circuit with said reactive means for conducting the current produced by the decay of flux in said reactive means when the current flow therethrough is interrupted, and variable impedance means in circuit with said valve means for adjusting the rate of decay of said flux.

24. For use in supplying energy to a work circuit from a source of current, the combination comprising reactive means in inductive relationship with said work circuit, means for supplying current from said source through said reactive means, means responsive to the current flow through said reactive means for interrupting the supply of current from said source through said reactive means and electric discharge valve means in circuit with said reactive means for conducting the current produced by the decay of flux in said reactive means when the current flow therethrough is interrupted.

25. For use in supplying energy to a work circuit from a source of current, the combination comprising a transformer having a primary and a secondary, said secondary being in said work circuit, means for supplying current from said source through said primary, means for interrupting the supply of current from said source through said primary and electric discharge valve means in circuit with said primary for conducting the current produced by the decay of flux in said transformer when the current flow therethrough is interrupted.

DONALD P. FAULK.

Disclaimer 2,300,538.—*Donald P. Faulk*, Pittsburgh, Pa. ELECTRIC DISCHARGE APPARATUS. Patent dated Nov. 3, 1942. Disclaimer filed Nov. 12, 1947, by the assignee, *Westinghouse Electric Corporation*, formerly Westinghouse Electric & Manufacturing Company.

Hereby enters this disclaimer to claims 1 and 3 of said specification.

[*Official Gazette December 30, 1947.*]